United States Patent [19]

Iwanaga

[11] Patent Number: 5,411,713
[45] Date of Patent: May 2, 1995

[54] OZONE GENERATING APPARATUS

[75] Inventor: Masao Iwanaga, Tokyo, Japan

[73] Assignee: I.T.M. Corporation, Tokyo, Japan

[21] Appl. No.: 907,780

[22] Filed: Jul. 1, 1992

[30] Foreign Application Priority Data

Jul. 3, 1991 [JP] Japan .................. 3-189196

[51] Int. Cl.6 .................. B01J 19/08; C01B 13/11
[52] U.S. Cl. .................. 422/186.15; 422/186.07; 204/176
[58] Field of Search .......... 422/186.07, 186.14, 422/186.15, 186.18; 204/176

[56] References Cited

U.S. PATENT DOCUMENTS

| | | | |
|---|---|---|---|
| 4,138,724 | 2/1979 | Kawauchi | 364/500 |
| 4,606,892 | 8/1986 | Bachhofer et al. | 422/186.2 |
| 4,666,679 | 5/1987 | Masuda et al. | 422/186.2 |
| 4,693,870 | 9/1987 | Gloor et al. | 422/186.19 |
| 4,816,229 | 3/1989 | Jensen et al. | 422/186.2 |
| 4,818,498 | 4/1989 | Bachhofer et al. | 422/186.2 |
| 4,882,129 | 11/1989 | Andrews et al. | 422/186.2 |
| 4,892,713 | 1/1990 | Newman | 422/186.07 |
| 5,106,589 | 4/1992 | Conrad | 422/180.15 |
| 5,145,653 | 9/1992 | Fischer et al. | 422/186.18 |

Primary Examiner—Donald P. Walsh
Assistant Examiner—Daniel Jenkins
Attorney, Agent, or Firm—Price, Heneveld, Cooper, DeWitt & Litton

[57] ABSTRACT

An ozone generating apparatus has a plurality of ozone generating units connected in series to form a plurality of stages along the flow path of a gas. Each ozone generating unit has an ozonizing chamber having a material gas inlet and a product gas outlet and ozonizer discharge electrodes disposed in the ozonizing chamber and connected to an AC high-voltage source. The voltage applied to said ozonizing discharge electrodes of each successive stages is so varied that the ozonizing discharge electrodes of each downstream stage, as viewed in the direction of flow of the gas, is supplied with a lower voltage than the voltage supplied to said ozonizer discharge electrodes of an adjacent upstream stage. A series connection of a plurality of ozone generating units can form a composite ozone generating unit, and a plurality of such composite units may be connected in series to form a plurality of stages. The voltages applied to such successive stages is varied in the same manner a above. The ozone generating unit and the AC high-voltage source can have modular construction.

27 Claims, 12 Drawing Sheets

OZONE GENERATING APPARATUS

BACKGROUND OF THE INVENTION

The present invention relates to an ozone generating apparatus for generating ozone which is used in various processes or treatments such as semiconductor production processes, deodoration of various wasted gases, industrial and medical treatments, cleaning, sterilization and or decoloration of drinking water, running water or sewage. More particularly, the present invention is concerned with a ozone generating apparatus which has improved performance and which is capable of generating ozone at a large generating rate.

In recent years, there is an increasing demand for generating ozone of high concentration at a large rate, in order to meet demands from various processes and treating systems of the kind mentioned above. Eitherto, such requirement has been met by a system employing a plurality of small-capacity ozone generators which are driven by an RF high voltage power supply as shown in FIG. 16. Each such ozone generator, therefore, generates ozone of high concentration at a comparatively small rate. These small-capacity ozone generators are connected in parallel as shown in FIG. 17, so that the whole system can produce ozone of high concentration at a large rate. This system, however, is complicated in construction and, hence, requires a large cost of installation, as well as laborious protective maintenance.

Another way to meet the demand for generation of ozone at large rate is to use a single ozone generating apparatus having a large generation capacity. Such ozone generating apparatus employs an ozonizer discharge electrode having large electrostatic capacitance which essentially requires that the frequency of the driving electric power be low, with the result that the ozone generating efficiency is correspondingly reduced disadvantageously.

SUMMARY OF THE INVENTION

Accordingly, an object of the present invention is to provide a small-sized and inexpensive ozone generating apparatus capable of efficiently generating ozone of high concentration at a large generation rate, thereby overcoming the problem of the known art.

The present invention is based upon the result of a minute analysis of the ozone generating process taking place in an ozone generating apparatus. Namely, the present inventors have clarified the roles or functions performed in the ozone generating process by various portions of the ozone generating apparatus. With such knowledge, the inventors have been able to optimize operating conditions of such portions of the apparatus using minimal units, thus accomplishing the present invention.

The ozone generating apparatus of the present invention has an ozonizing chamber which defines a passage for gases leading from an inlet for a material gas, e.g., air or oxygen, to an outlet of product gas, e.g., oxygen or air rich in ozone. The material gas is ozonized while flowing through this ozonizing chamber, by the effects of ozonizing discharge electrodes which are arranged in stages along the flow of the gas and which are supplied with different levels of voltage such that the electrode which is on the downstream side as viewed in the direction of flow of the gas is supplied with higher voltage than upstream electrode.

The material gas is made to flow from the inlet towards the output through the ozonizing chamber. The material gas passes first through an upstream ozonizing stage or region which is under the influence of an electric discharge from an upstream ozonizing discharge electrode, so as to be ozonized to become an ozone-containing gas having a certain level of ozone concentration. The gas then flows through a downstream ozonizing stage or region which is under the influence of an electric discharge from a downstream ozonizing discharge electrode which is supplied with a voltage lower than that for the upstream electrode, so as to be further ionized to a higher degree of ozone concentration.

The ozone gas having elevated ozone concentration may be further ionized as required by one or more subsequent ozonizing regions having ozonizing discharge electrodes supplied with voltages equal to or lower than that applied to the above-mentioned downstream ozonizing discharge electrode.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
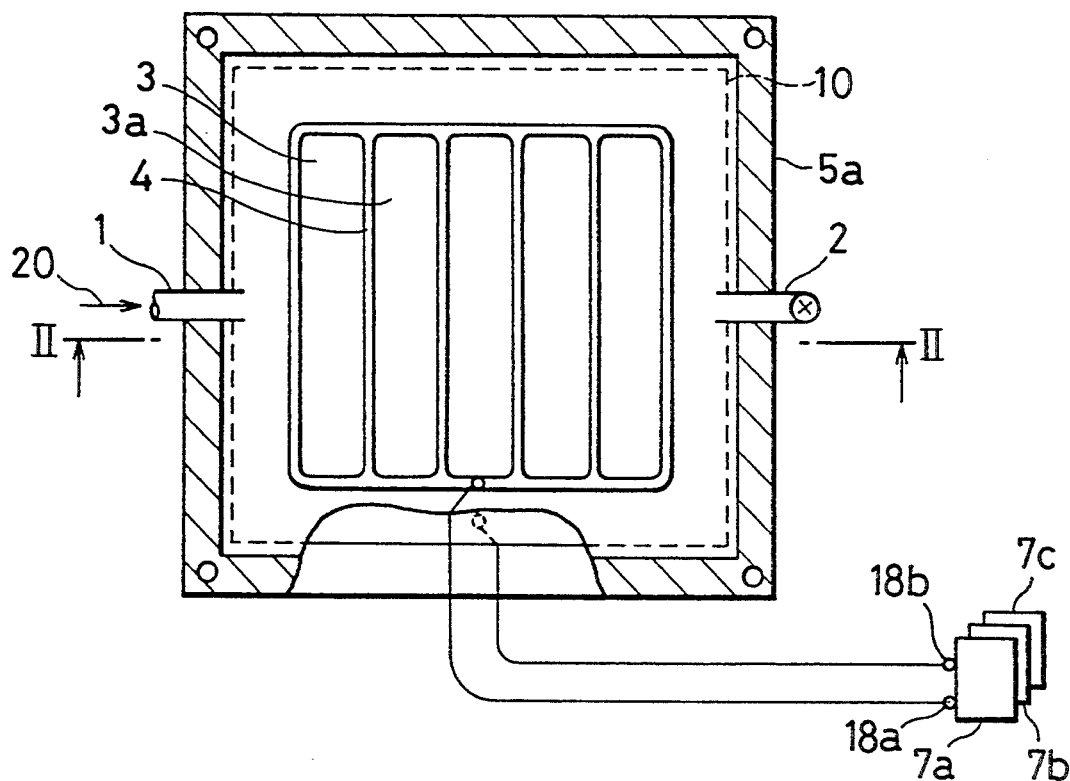
FIG. 1 is a sectional view of an embodiment of the ozone generating apparatus in accordance with the present invention, taken along a line I—I of FIG. 2.

A first embodiment of the ozone generating apparatus of the present invention will be described with reference to FIGS. 1 to 3. As will be seen from these Figures, an ozone generating apparatus embodying the present invention has a plurality of ozone generating units 5a, 5b and 5c which are connected in series through communication pipes 6 so as to form a plurality of ozonizing stages. Each ozone generating unit has an ozone generating chamber 3 provided with a material gas inlet 1 and a product gas outlet 2 and a ozonizer discharge electrodes 4 disposed therein.

The ozonizer discharge electrodes 4 of the respective ozone generating units 5a, 5b, 5c are connected to independent AC high-voltage sources 7a, 7b, 7c the output voltages of which are varied such that the voltage of the source 7b is lower than that of the source 7a but higher than that of the source 7c.

Each ozonizer discharge electrode has a linear form as illustrated and is disposed to oppose a tabular induction electrode 10 across a dielectric plate 8.

The ozone generating units 5a, 5b and 5c are stacked one on another with double-sided cooling plates 11 interposed between respective two adjacent units 5a, 5b; 5b, 5c, with top and bottom of the stack being connected by single-sided cooling plates 12. The stack thus formed is tied by a suitable means which is not shown, thus forming an integral structure. Preferably, the cooling plates 11, 12 are made from alumite aluminum coated with a corrosion resistant layer of aluminum oxide prepared by anodic oxidation, or a tufram-treated aluminum alloy. Tufram is a coating for aluminum and aluminum alloy surfaces including Teflon in an aluminum oxide coating prepared by anodic oxidation (alumite). The surface coating of Teflon and aluminum oxide is very hard with properties similar to Teflon.

Each of the cooling plates 11 and 12 has a cooling water passage 14 formed therein so as to connect a cooling water inlet 16a and a cooling water outlet 16b, so that cooling water introduced through the cooling water inlet 16a is circulated through the cooling water passage 14 and then discharged from the cooling water outlet 16b, thereby cooling the cooling plates 11, 12.

In a preferred form, the aforementioned tabular induction electrode 10 is bonded to the cooling surface of each cooling plate 11, 12 by means of a silicone grease having high heat conductivity or an expandable adhesive such a a silicone rubber adhesive 13, so that the heat from the tabular induction electrodes 10 is efficiently dissipated through the cooling plates 11, 12. The silicone grease or the adhesive 13 serves to absorb any thermal stress caused due to difference in the temperature between the induction plate 8 and the cooling plates 11, 12, while keeping closeness of contact, thus maintaining good cooling conditions.

The AC high-voltage sources 7a, 7b, 7c are connected at their output terminals 18 to the ozonizer discharge electrodes 4 while other output terminals 19 of these sources are connected to the tabular induction electrodes 10. It will be understood that, since the voltage of the AC high-voltage source 7b is lower than that of the AC high-voltage source 7a, the heat generated by the ozonizer discharge electrodes 4 connected to the source 7b exhibits smaller heat generation rate and, hence, lower temperature, than the ozonizer discharge electrodes 4 connected to the source 7a.

Consequently, the rate of generation of ozone in the second stage ozone generating unit 5b is some what smaller than that in the first stage ozone generating unit 5a, and the rate of generation in the unit 5b is smaller than that in the unit 5a because the intensity of the discharge electric field E2 in the unit 5b is lower than that of the discharge electric field in the unit 5b.

The material gas introduced into the first stage ozone generating unit 5a as indicated by arrow A1 is ozonizing as it flows through the ozonizing chamber and then flows out of the first stage ozone generating unit 5a as indicated by arrow A2. The partly ozonized gas is then introduced into the second ozone generating unit 5b as indicated by arrow A3. The ozone contained by the gas flowing into the second stage ozone generating unit 5b tends to be decomposed to become oxygen due to heat in the second stage ozone generating unit 5b. This tendency, however, is suppressed because the temperature in the second stage ozone generating unit is lower than that in the first unit as described above. Therefore, the ozone concentration in the gas flowing out of the second stage ozone generating unit 5b as indicated by arrow A4 is higher than the ozone concentration which would be obtained if the output voltage of the AC high-voltage source 7b were the same as that of the AC high-voltage source 7a.

The gas having elevated ozone concentration is then introduced into the ozonizing chamber 3c of the third stage ozone generating unit 5c through the communication pipe 6, so as to be further ozonized by the effect of a discharge electric field E3 generated by a voltage lower than that of the AC high-voltage source 7b. Consequently, the ozone concentration is further enhanced as the gas flows from the inlet 1 as indicated by arrow A5 towards the outlet as indicated by arrow A6 through the ozonizing chamber, whereby a desired ozone concentration can be attained.

The voltage of the AC high-voltage source 7c connected to the third stage ozone generating unit 5c is still lower than that of the AC high-voltage source 7b of the preceding stage, so that the temperature in the ozonizing chamber 3c of the third stage is lower than that in the ozonizing chamber 3b of the preceding stage. Therefore, any tendency of thermal decomposition of the ozonized gas in the ozonizing chamber of the third stage is suppressed. Consequently, the ozone concentration in the gas discharged from the outlet 2 of the third stage ozone generating unit 5c is higher than the concentration which would be obtained if the output voltage of the AC high-voltage source 7c were set to the same level as that of the AC high-voltage source 7b.

Figure 5:
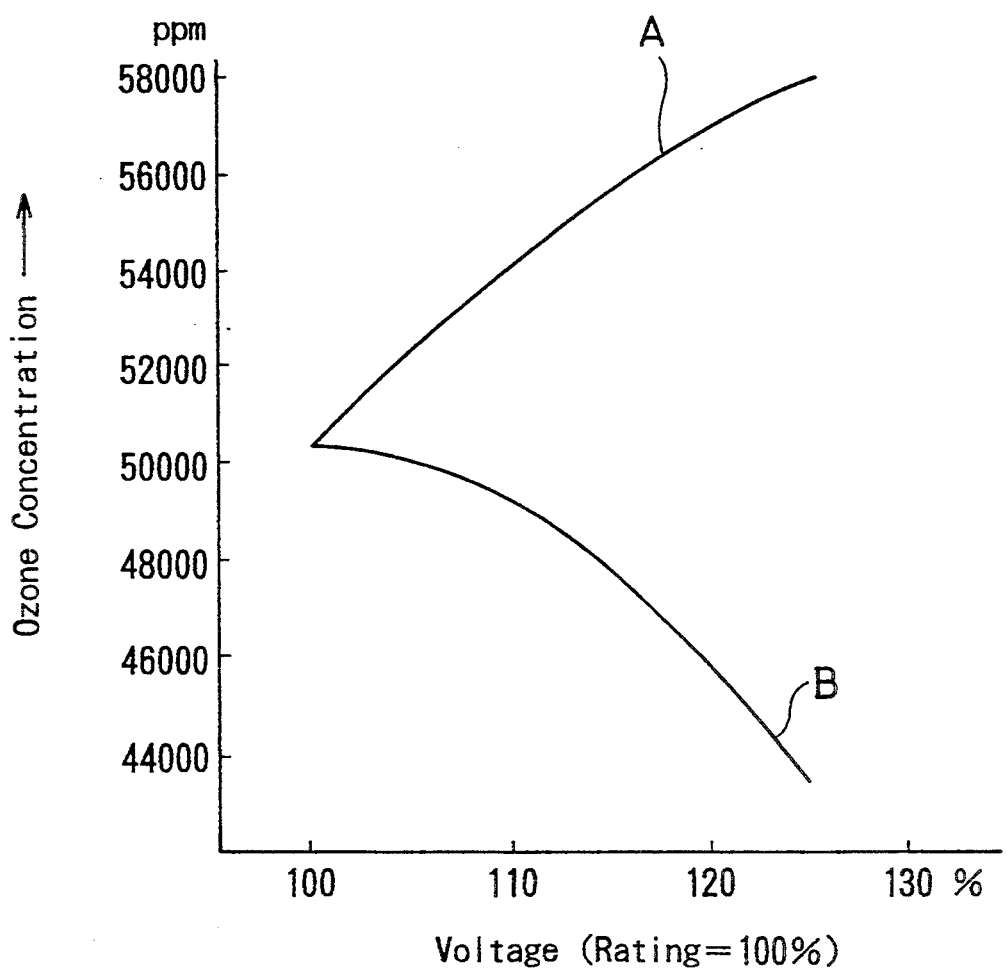
FIG. 5 is a graph showing the relationships between ozonizing voltage and ozone concentration as observed in the ozone generating apparatus of FIGS. 1 to 3.

This advantageous effect will be more clearly realized from the following description. It is assumed here that the second stage ozone generating unit 5b is supplied with a voltage which is the rated voltage of this unit, while the third stage ozone generating unit 5c is supplied with a voltage which is 80% of the above-mentioned rated voltage, with the voltage applied to the first stage ozone generating unit 5a progressively increased from 100% to 130% of the above-mentioned rated voltage. In such a case, the ozone concentration measured at the production gas outlet 2 of the third stage ozone generating unit 5c progressively increases from 50000 ppm to 58000 ppm in accordance with the rise of the voltage applied to the first stage ozone generating unit 5a, as shown by curve A in FIG. 5.

Figure 17:
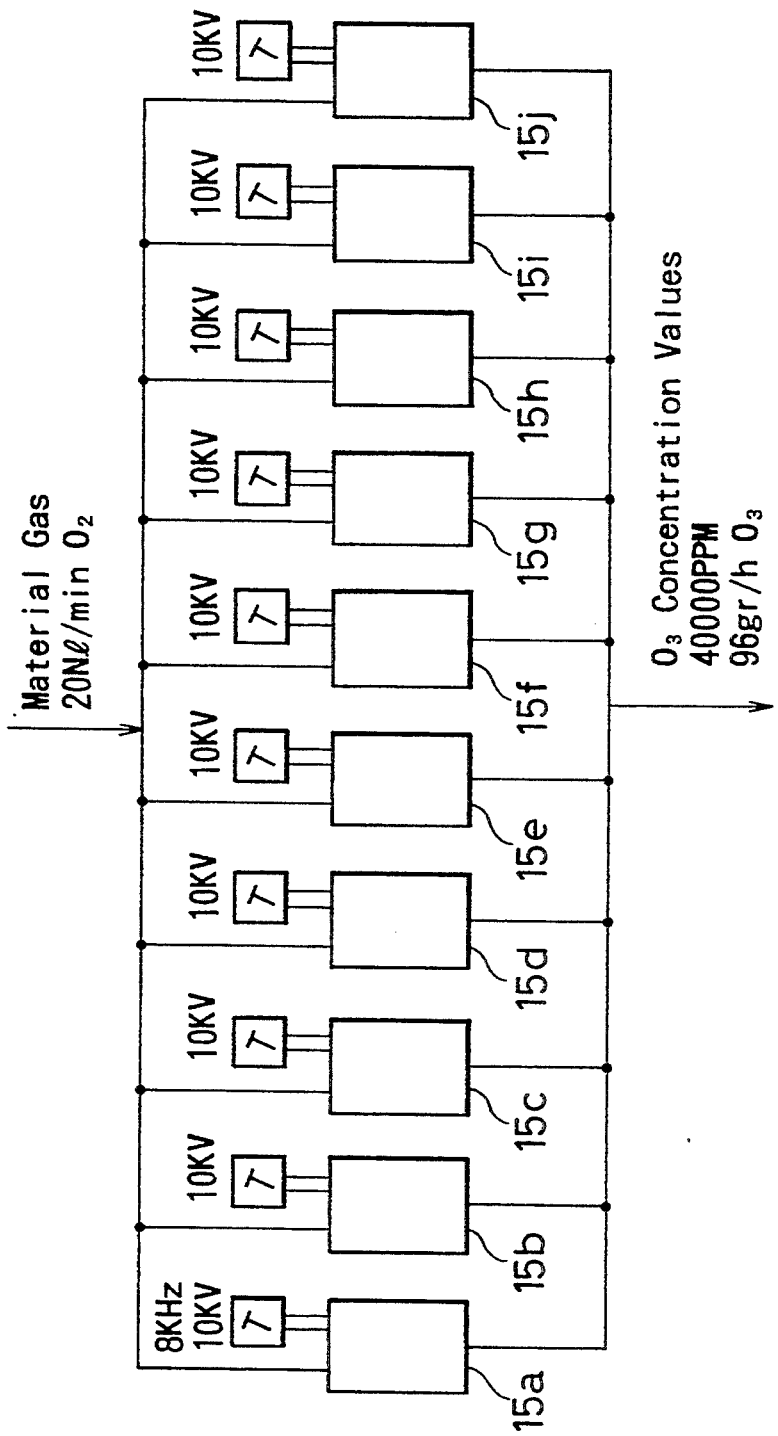
FIG. 17 is a sectional view of a known ozone generating apparatus, corresponding to the illustration in FIG. 8.

In contrast, in known ozone generating apparatus, the ozone generating units 5a, 5b, 5c are connected to a common AC high voltage source 7 as shown in FIG. 17. Therefore, high temperatures are developed in the second and third stage ozone generating units 5b and 5c, so that the ozone generated in the first stage ozone generating unit 5a is thermally decomposed in the second and the third third stage ozone generating units 5b, 5c and the ozone generated in the second stage ozone generating unit 5b is thermally decomposed in the third stage ozone generating unit 5c. Consequently, it is not possible to obtain high ozone concentration at the product gas outlet 2 of the third stage ozone generating unit 5c.

Figure 16:
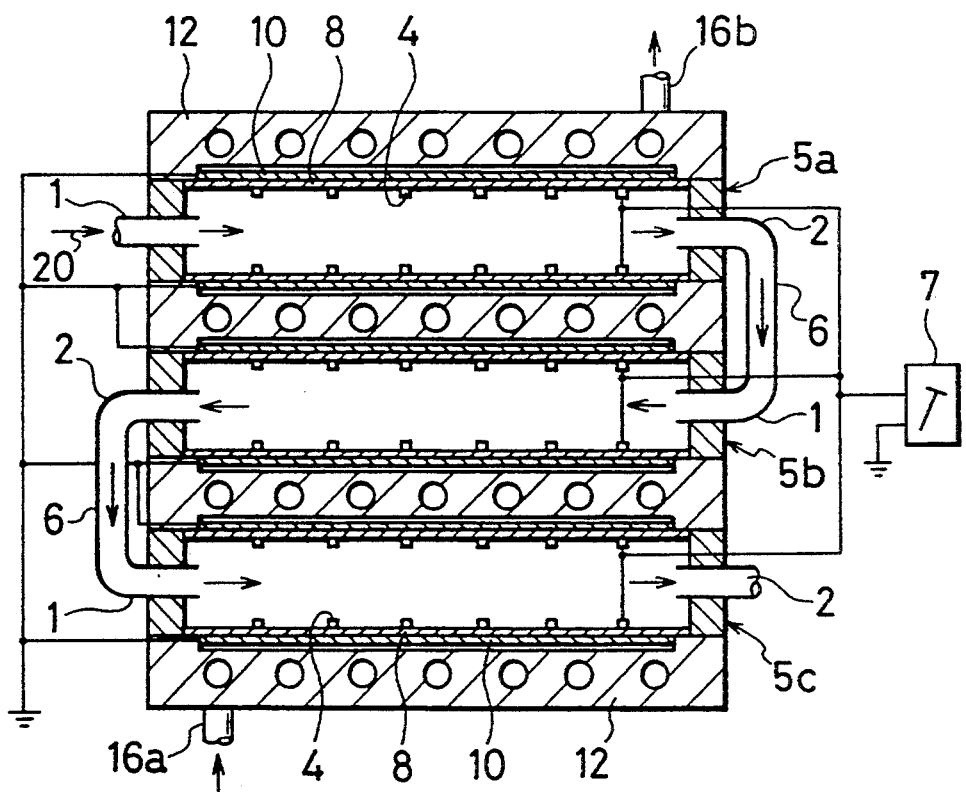
FIG. 16 is a sectional view of a known ozone generating apparatus, corresponding to the illustration in FIG. 2.

This drawback of the known apparatus will be more clearly understood from the following fact. It is assumed that the voltage applied to the ozone generating units 5a, 5b, 5c by the common source as shown in FIG. 16 is progressively increased from 100% to 125% of the rated voltage. In such a case, the ozone concentration as measured at the product gas outlet of the third stage ozone generating unit is progressively reduced from 50000 ppm to 4000 ppm as the voltage rises, as shown by curve B in FIG. 5.

Figure 2:
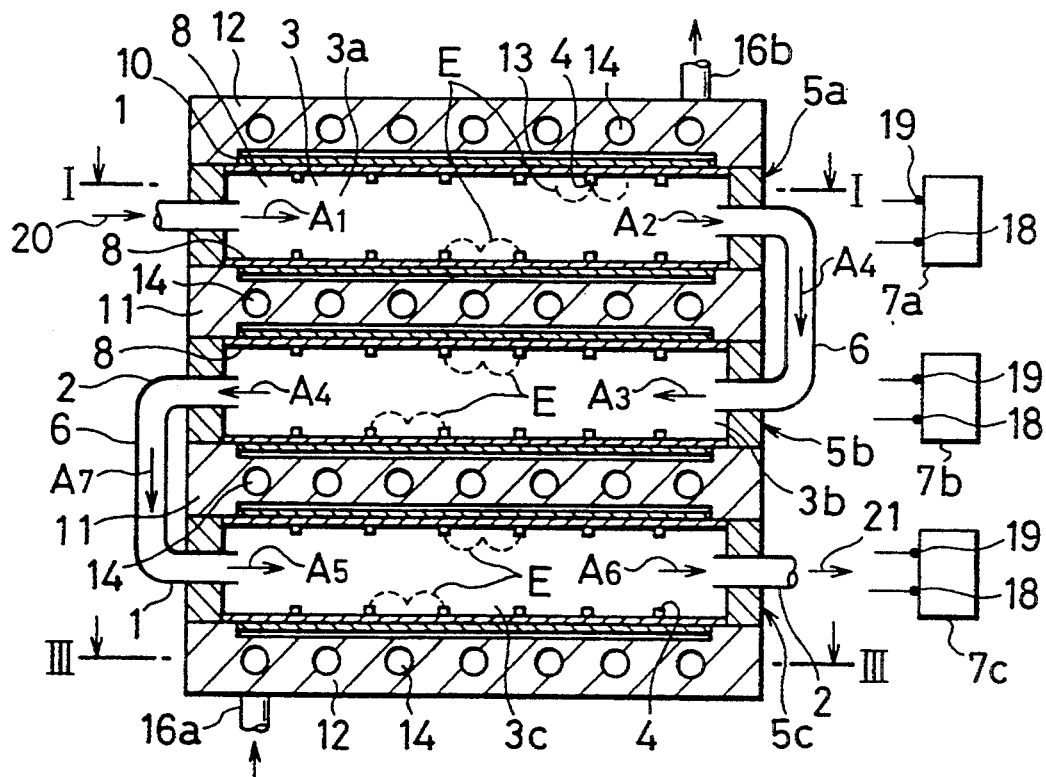
FIG. 2 is a sectional view taken along the line II—II of FIG. 1.
Figure 3:
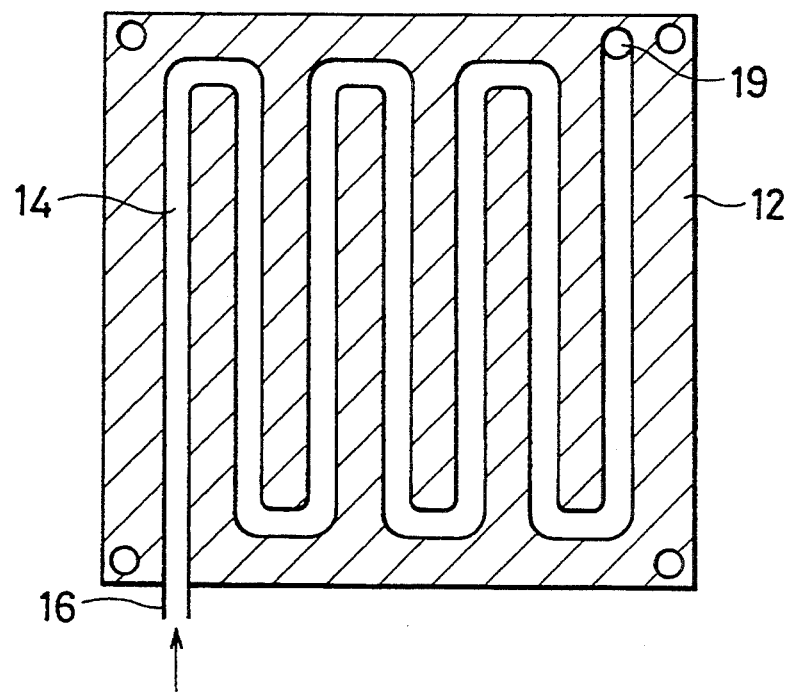
FIG. 3 is a sectional view taken along the line III-—III of FIG. 2.

In FIGS. 1 and 2, the AC high-voltage sources 7a, 7b and 7c are illustrated as separate sources. This, however, is only illustrative and the arrangement may be such that different voltages are derived by dividing output voltage of a single AC voltage source, such that the successive stages formed by the ozonizing units are supplied with voltages as described before.

Figure 4:
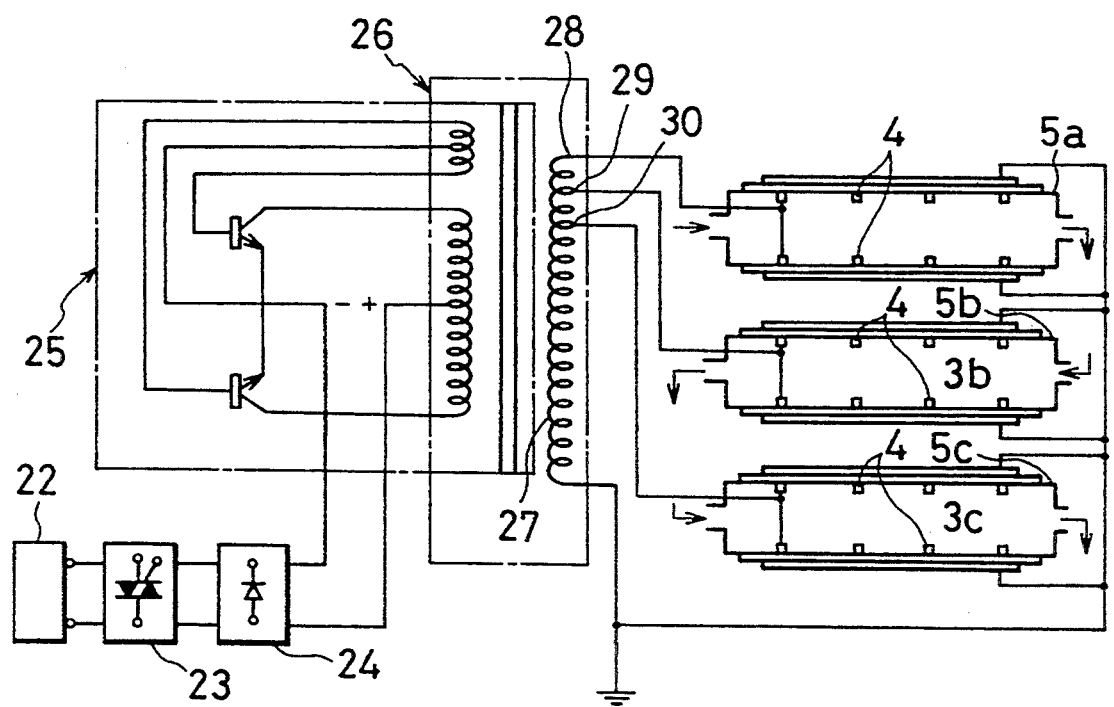
FIG. 4 is a circuit diagram showing a circuit used for connecting the ozone generating apparatus of FIG. 2 to an AC high voltage power supply of a type different from that shown in FIG. 2.

For instance, FIG. 4 shows an example of the voltage source in which the voltage of commercial source 22 is regulated by a voltage regulator 23 and, after a rectification by a rectifier 24, converted into AC current by an oscillator 25 the output of which is boosted by a transformer 26 having a secondary winding 27 with output taps or terminals 28, 29 and 30.

These output terminals 28, 29 and 30 are connected to the ozonizer electrodes 4 of the ozone generating units 5a, 5b, 5c so that AC high voltages are supplied to the successive ozone generating units 5a, 5b and 5c in such a manner as to decrease successively.

In the embodiment described hereinbefore, three ozone generating units 5a, 5b and 5c are connected in series so as to form three stages. This arrangement not exclusive and may be changed as required.

Figure 6:
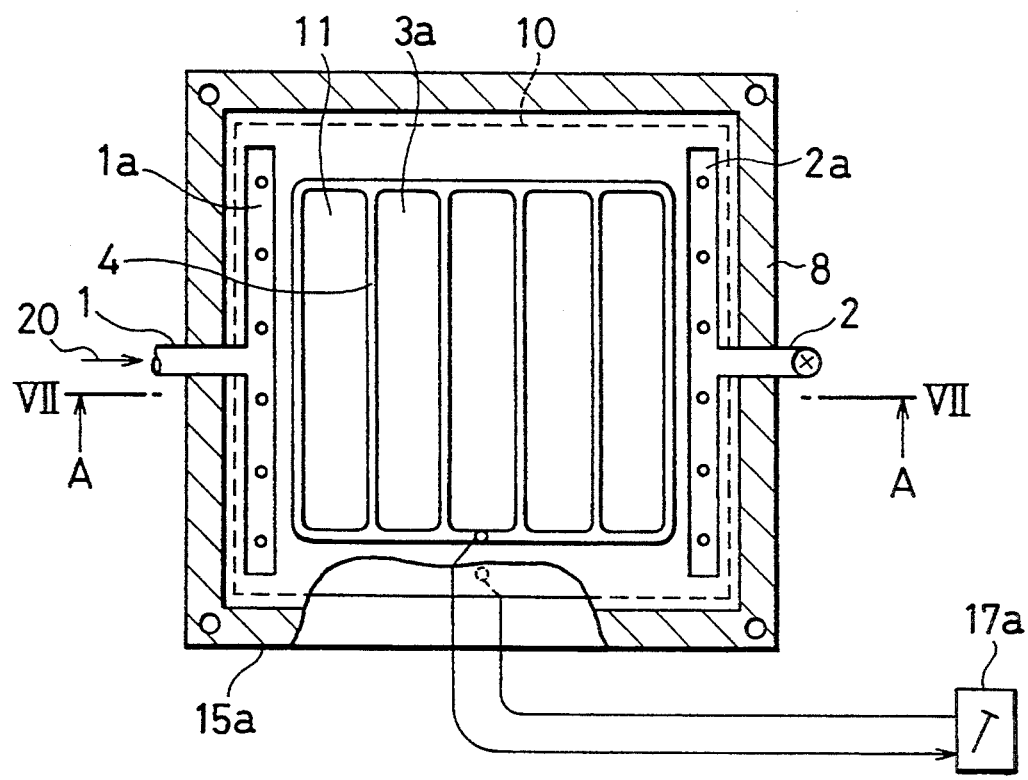
FIG. 6 is a sectional view of another embodiment of the ozone generating apparatus in accordance with the present invention.
Figure 7:
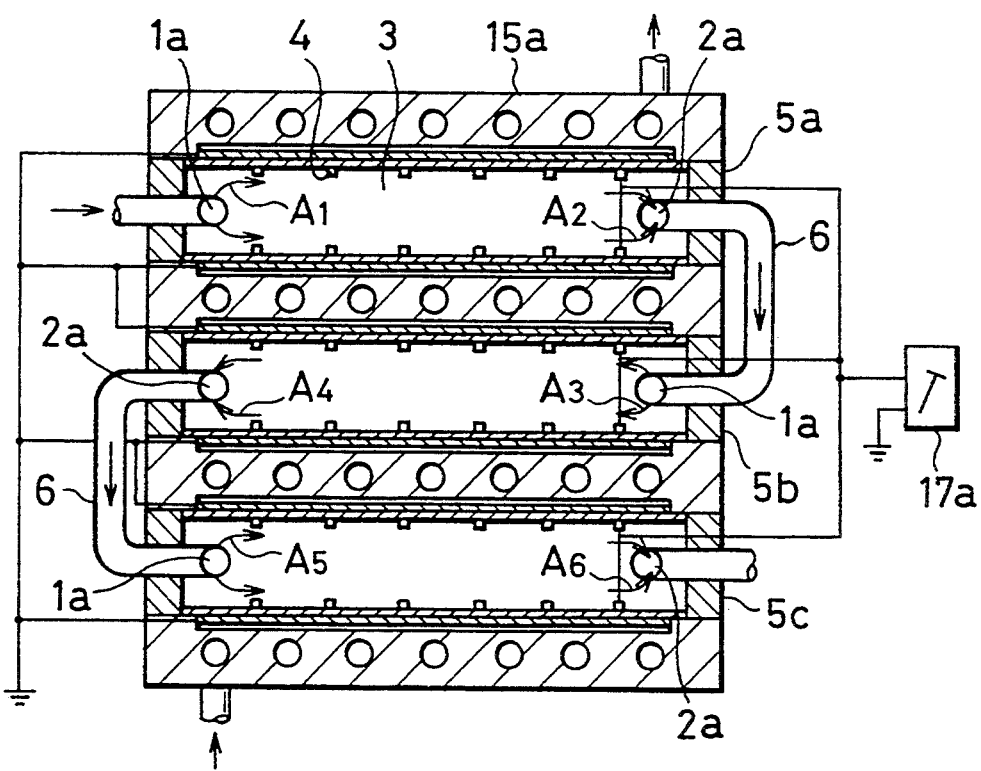
FIG. 7 is a sectional view taken along the line VII—VII of FIG. 6.
Figure 8:
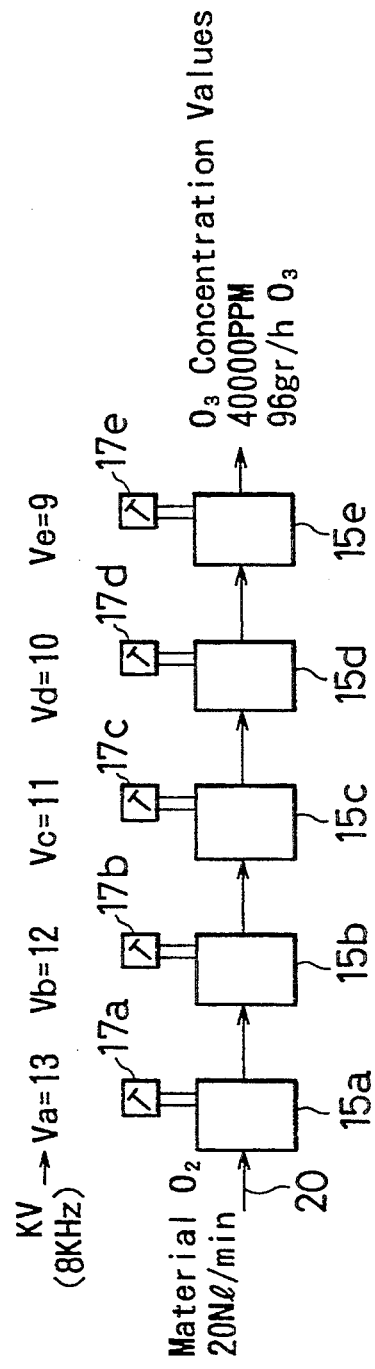
FIG. 8 is a block diagram of a different embodiment in which five ozone generating composite units of the type shown in FIGS. 6 and 7 are connected in series to form a multi-stage ozonizing system.
Figure 9:
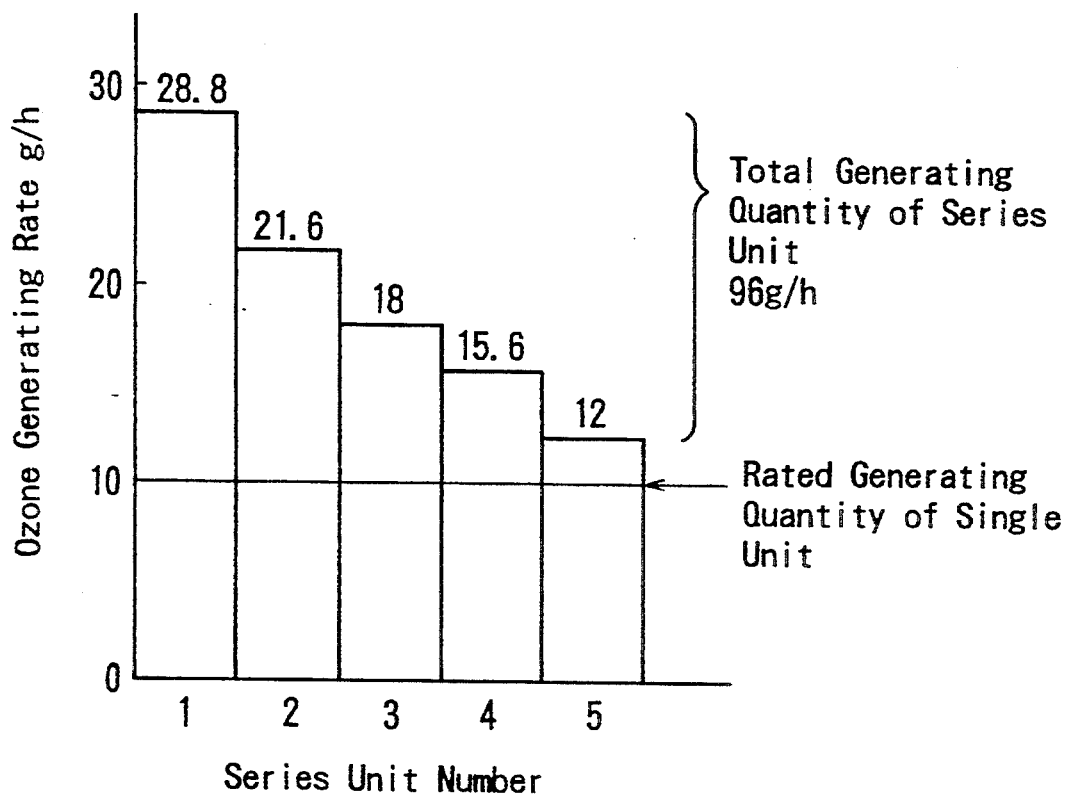
FIG. 9 is a bar graph showing the ozone generating rates in the successive stages of the system shown in FIG. 8.

For instance, the ozone generating apparatus of the present invention may be constructed as shown in FIGS. 6 to 8 which show another embodiment. Referring to FIGS. 6 and 7, a composite ozone generating unit 15a has a plurality of ozone generating units 5a, 5b, 5c which are connected in series through communication pipes 6 to form a continuous flow path of the gas. Each ozone generating unit 5a, 5b or 5c has an ozonizing chamber 3 accommodating a perforated gas distribution pipe leading from the material gas inlet 1, a perforated gas collecting pipe 2a connected to the product gas outlet 2. A plurality of ozonizer discharge electrodes 4 are provided in the ozonizing chamber 3. The ozonizing discharge electrodes 4 of the ozone generating units 5a, 5b, 5c are supplied with the same level of voltage from a common AC high-voltage source 17a. Five such composite ozone generating units, denoted by 15a, 15b, 15c, 15d and 15e, are connected in series as shown in FIG. 8, and are supplied with electrical power of the same frequency, e.g., 8 KHz and different voltages Va, Vb, Vc, Vd and Ve, from different AC high-voltage sources 17a, 17b, 17c, 17d and 17e. The voltages are successively reduced such that, for example, Va=13 Kv, Vb=12 Kv, Vc=11 Kv, Vd=10 Kv and Ve=9 Kv.

In operation of the embodiment shown in FIG. 8, when a material gas 20 is supplied to the first composite ozone generating unit 15a, an ozone concentration of 12000 pm is obtained at the outlet of the first composite ozone generating unit 15a. Further increased ozone concentration values are obtained as 21000 ppm, 28500 ppm, 35000 ppm and 4000 ppm at the outputs of the successive composite ozone generating units.

As will be seen form FIG. 8, the ozone generation rate in the first to fifth composite ozone generating unit 15a is 28.8 g/h and the ozone generating rates in the second to fifth composite generating units 15b to 15e are 21.6 g/h, 18 g/h, 15.6 g/h and 12 g/h, respectively. The total ozone generating rate throughout the first to fifth composite ozone generating units 15a to 15e is 96 g/h.

Thus, in the embodiment shown in FIG. 8, ozone gas having ozone concentration of 4000 ppm is obtained at a rate of 96 g/h at the production gas outlet of the fifth composite ozone generating unit 15e when the material gas 20 is supplied to the first composite ozone generating unit 15a at a rate of 20 Nl/min. (normal liter per minute indicates the flow quantity per minute at standard conditions, (0° C. 1 atm.)).

In a large scale ozone generating apparatus which produces ozone at such a large rate, it is essential that uniform flow velocity distribution is obtained in each unit. The perforated distribution pipe 1a and the perforated collecting pipe 2a are intended to realize such uniform flow velocity distribution.

Assume here that a plurality of composite ozone generating units of the type mentioned above are arranged in parallel and are supplied with the same voltage, e.g., 10 Kv, at 8 Kz as in known ozone generating system. In order to generate ozone by such a system at the same concentration and the same generation rate as those in the embodiment shown in FIG. 8, the number of the composite ozone generating units which are to be connected in parallel will be ten, 15a to 15j as shown in FIG. 17, which is twice that employed in the embodiment shown in FIG. 8.

A general discussion will now be given of what is believed to be the principle of operation of the embodiments described in connection with FIGS. 1, 2, 3 and 4 and FIGS. 6; 7, 8 and 9. In each ozonizing chamber, generation of ozone by the electric discharge and thermal decomposition of ozone due to heat produced by the discharge take place simultaneously. The rate of thermal decomposition becomes greater as the ozone concentration becomes greater. When a plurality of composite ozone generating units are connected in series so as to form a plurality of stages, it is possible to increase the final ozone generation rate by suppressing the thermal decomposition of ozone in downstream stages, by decreasing the voltages supplied to the downstream stages.

Figure 10:
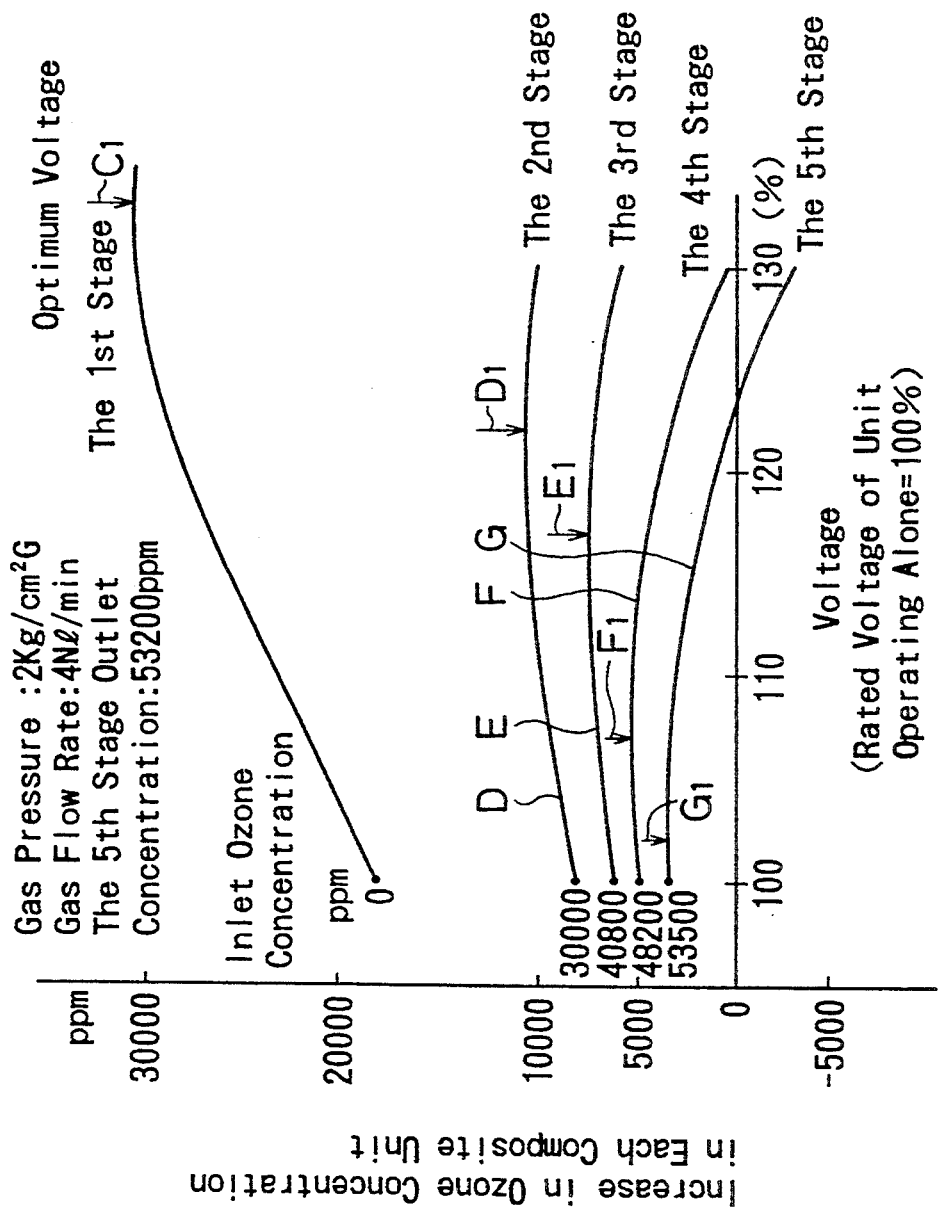
FIG. 10 is a diagram showing the relationship between increment of ozone generating rate and ozonizing voltage as observed in the ozone generating system shown in FIGS. 6 to 8.

An experiment was conducted by using the ozone generating apparatus of the type shown in FIGS. 6, 7 and 8, in which voltages applied to the respective composite units are varied to determine optimum voltages to be applied to these composite units, the results being shown in FIG. 10. In the composite unit 15a, thermal decomposition of ozone is not noticeable because the material gas introduced into this unit is substantially free of ozone. The ozone concentration at the outlet of this unit progressively increases in accordance with the rise of the voltage applied, as shown by curve d and starts to decrease when the voltage exceeds 132% of the rated voltage. It is therefore understood that the optimum voltage to be applied to the composite unit 15a is 132% of the rated voltage, with the production of ozone at the maximum concentration of 30000 ppm.

This ozone gas is then introduced into the composite unit 15b. A curve D in FIG. 10 shows the ozone concentration obtained at the outlet of this composite unit 15b. The ozone concentration exhibits a peak of 40800 ppm at a voltage which is 122% of the rated voltage, as indicated by arrow D1. This indicates that, since thermal decomposition in this composite unit 15b is vigorous due to high ozone concentration of 30000 ppm at the inlet, the voltage which maximizes the ozone concentration at the outlet of this composite unit is lowered to 122% of the rated voltage, from 132% applied to the upstream composite unit 15a.

Likewise, the optimum voltages E, F and G for the downstream composite units 15c, 15d and 15e are decreased in the mentioned order. A maximum ozone concentration of 53500 ppm is obtained at the outlet of the most downstream composite unit 15e when the voltages applied to the respective composite units are optimized in accordance with the experiment result shown in FIG. 10.

The number of the composite units connected in series may be increased as long as such increase produces an appreciable effect in enhancing the ozone concentration. In such a case, since the ozone concentration decreases towards the downstream end unit, the voltage is also varied to decrease towards the most downstream unit, thus embodying the present invention.

In the ozone generating apparatus of the present invention, the composite ozone generating units 15a to 15e can be constructed as modules having the same size and configuration. The variable-voltage AC high voltage sources 17a to 17e also may have an identical module construction and factors such as variable resistance in the module is varied to adapt these module voltage sources to optimum voltages described before. Such module constructions of the ozone generating units and AC high-voltage sources are quite advantageous from the view points of production and management of the apparatus, as well as cost.

Figure 11:
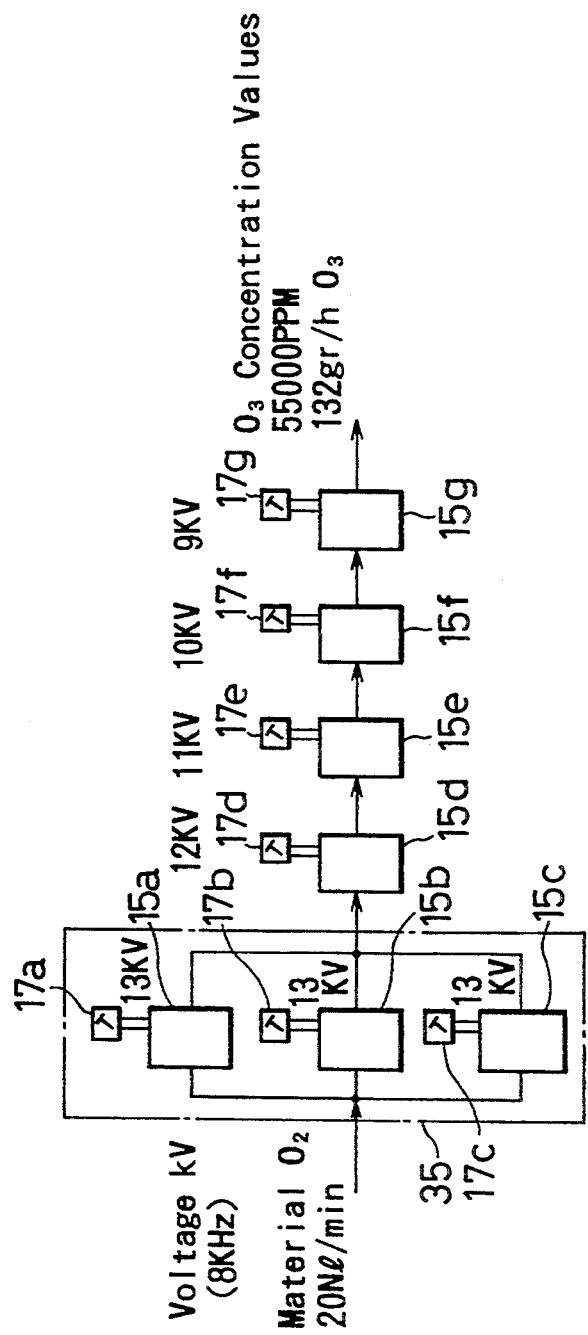
FIG. 11 is a block diagram of an ozone generating system different from that shown in FIGS. 6 to 8.

A problem may be encountered in carrying out the invention in that, when the ozone generating rate or the amount of the gas to be processed is large, the optimum voltage explained in connection with FIG. 1 becomes too high particularly in the first composite unit, making it difficult to construct the unit 15a and the voltage source 17a as the modules same as those of other composite units. In such a case, it is advisable that the first stage is composed of two or more composite units connected in parallel, as shown in FIG. 11. With such an arrangement, each composite unit of the first stage can be constructed as the module because the rate of processing of gas in each such composite unit is small enough to lower the level of the optimum voltage.

More specifically, if it is required to generate ozone gas having ozone concentration of 55000 ppm by supplying $O_2$ material gas to the apparatus of FIG. 11, the first stage is composed of a plurality of composite ozone generating units 15a, 15b, 15c each having a module construction, so that each composite unit share, for example, ⅓ of the total flow rate of the material gas. With this arrangement, the optimum voltage applied to the first stage can be reduced so as to permit the use of module variable AC high-voltage sources 17a, 17b and 17c, whereby the ozone generating apparatus having the required performance is obtained in the form of a group 35 of composite ozone generating units 15a, 15b, 15c. It is therefore possible to construct a large-scale ozone generating system from modular ozone generating units and modular voltage sources. Namely, in such a system, the first stage is composed of the group 35 of composite ozone generating units, and the second to fifth stages are formed by composite ozone generating units 15d, 15e, 15f and 15g.

A test operation was conducted with the embodiment shown in FIG. 11, in which material $O_2$ gas was supplied to the material gas inlet of the first stage, i.e., the group 35 of the composite ozone generating units at a rate of 20 Nl/min, while employing AC high voltage sources 17a to 17c of 13 Kv to the independent composite ozone generating units 15a to 15c of the group 35 forming the first stage, while employing an AC high-voltage source 17d of 12 Kv for the composite ozone generating unit 15d of the second stage, 17e of 11 Kv for the composite ozone generating unit 15e of the third stage, 17f of 10 Kv for the composite ozone generating unit 15 f of the fourth stage and 17 g of 9 Kv for the composite ozone generating unit 15g of the fifth stage. In this experiment, ozone gas having ozone concentration of 55000 ppm was obtained at at a rate of 132 g/h at the outlet of the composite ozone generating unit 15g of the fifth stage.

In the embodiment shown in FIG. 11, it is possible to control the ozone concentration at the outlet of the first stage formed by the group 35 of the composite ozone generating units 15a, 15b, 15c, by independently varying the voltages applied by the AC high-voltage sources 17a, 17b, 17c.

Figure 12:
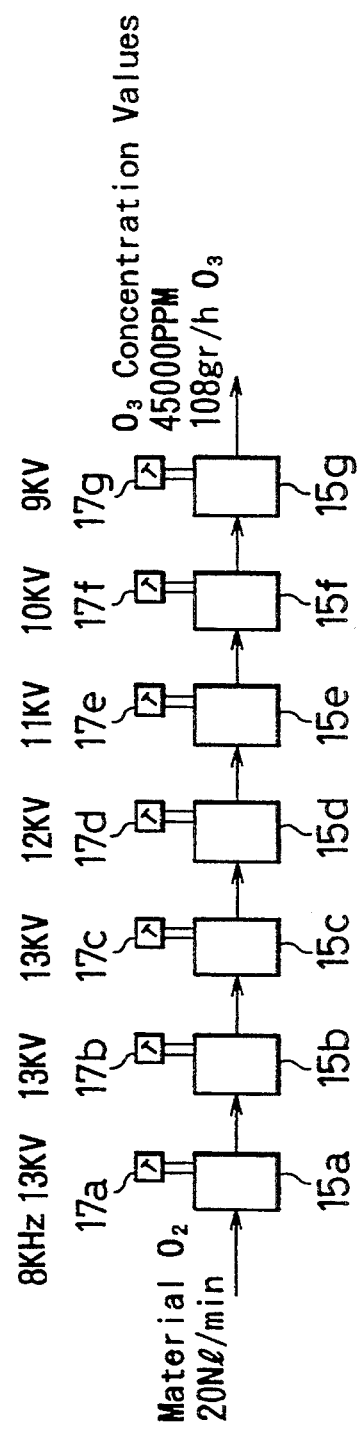
FIG. 12 is a block diagram of a modification of the system of FIG. 11 having a modified portion.

The invention does not exclude such a variation that the composite ozone generating units 15a, 15b, 15c of the group 35 forming the first stage are connected in series as shown in FIG. 12. In such a variation, when the material $O_2$ gas is supplied to the inlet of the first stage at the same rate as that in the embodiment shown in FIG. 11, i.e., 20 Nl/min, the ozone gas concentration obtained at the outlet of the composite ozone generating unit 15g of the fifth stage is 45000 ppm and the generation rate if 108 g/h, both being lower than those attained by the embodiment shown in FIG. 11.

Figure 13:
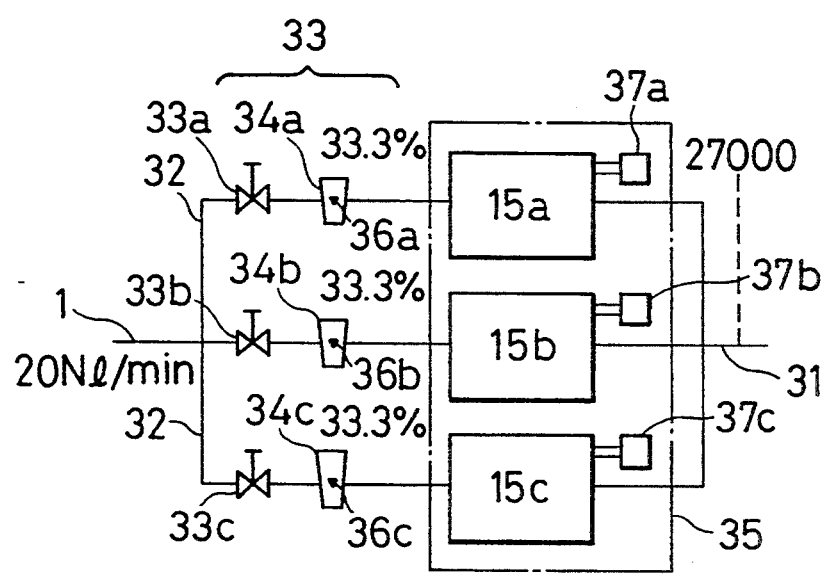
FIG. 13 is a block diagram of another modification of the system shown in FIG. 11.

FIG. 13 shows a different embodiment in which inexpensive fixed-voltage AC high-voltage sources 37a, 37b, 37c are used for the composite ozone generating units 15a, 15b, 15c of the group 35 forming the first stage, and the composite ozone generating units 15a, 15b, 15c are connected to the inlet 1 through a branch pipe 32 having flow distributing means 33 including flowmeters 34a, 34b, 34c upstream of the respective composite ozone generating units 15a, 15b, 15c and associated flow rate control valves 33a, 33b, 33c.

Numerals 36a to 36c show opening degree indices (arrow head positions) which indicate, by their vertical positions, the opening degrees of the flow rate control valves, i.e., the readings of the respective flowmeters 34a to 34c. Thus, FIG. 13 shows a state in which the material $O_2$ gas, supplied at the rate of 20 Nl/min, is equally shared by tile composite ozone generating units 15a to 15c. In this case, ozone gas having ozone concentration of 27000 ppm is obtained at the outlet 31 of the first stage.

Figure 14:
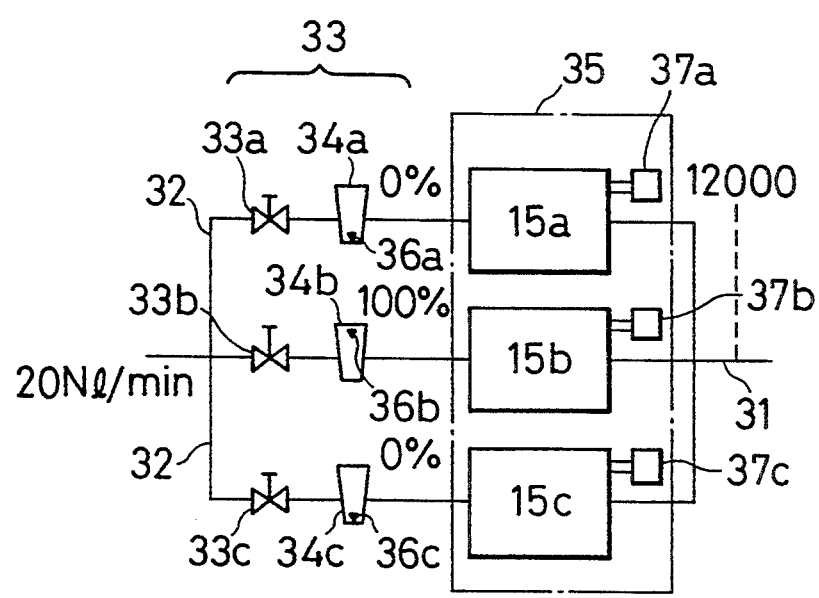
FIG. 14 is a block diagram of the portion shown in FIG. 13 in a state different from that shown in FIG. 13.

FIG. 14 shows the same arrangement as that shown in FIG. 13 in a different state. Namely, in this state, as indicated by the indices 36a to 36c, only one of the flowmeters indicates 100% opening while other two flowmeters indicate full close of the flow rate control valves, i.e., 0% opening. In this state, ozone gas of 12000 ppm is obtained at the outlet 31 of the first state, when the material gas is supplied at the same flow rate as that in the state shown in FIG. 13.

It is therefore understood that the ozone concentration at the outlet of the first stage can be controlled by using inexpensive fixed-voltage AC high-voltage sources 37a to 37c, together with the flow distributing means composed of inexpensive flow rate control valves 33a to 33c and flowmeters 34a to 34c which enable control of rates of supply of the material gas to respective composite ozone generating units 15a to 15c. Thus, a less expensive arrangement can be obtained as compared with the case where expensive variable-voltage AC high-voltage sources 17a to 17c are used for applying voltages to the composite ozone generating units in the group 35.

Figure 15:
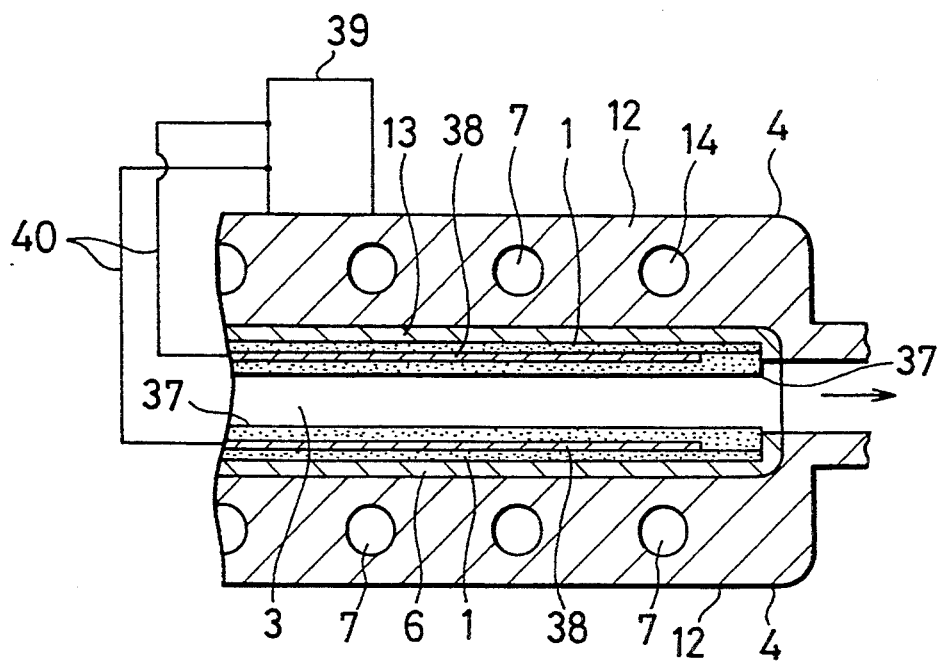
FIG. 15 is a detailed sectional view of a modification of a portion of embodiments shown in FIGS. 2 and 7.

The ozonizer discharge electrode 4 used in the embodiments shown in FIGS. 1 and 2 is of the type called a creepage discharge type. This, however, is only illustrative and the ozone generating apparatus of the present invention can employ discharge electrodes of the type called a spatial discharge electrode. FIG. 15 shows an example of a spatial discharge electrode. A pair of discharge electrodes 38 and 38 are disposed to oppose each other across the ozonizing space 3 and dielectric layers 37, and an AC high-voltage source 39 is connected between these discharge electrodes, so that electric field is formed to ionize the material gas between these dielectric layers 37. In FIG. 15, the same reference numerals are used to denote the same parts or components as those appearing in other Figures showing preceding embodiments.

As has been fully described, the present invention makes it possible to apply optimum high voltage to the ozonizer discharge electrodes of the ozone generating unit of the first stage so as to maximize the ozone concentration at the outlet of the first stage, and the voltages applied to the ozone generating units of the second and subsequent stages are varies such that the downstream stages are supplied with lower voltages. Namely, application of unnecessarily high voltages to the second and subsequent stages is avoided so as to suppress temperature rise in the ozonizing chambers of these stages. Consequently, undesirable thermal decomposition of ozone in downstream stage is suppressed, so that the ozone concentration obtained at the final stage is remarkably increased as compared with the conventional apparatus in which the ozone generating units of all stages are supplied with equal voltage.

Furthermore, according to the invention, the ozone generating units and the AC high-voltage sources can have module constructions, so that a large-scale ozone generating apparatus or system can be obtained at a low cost by simply connecting such module constructions.

In addition, when the first stage is composed of a plurality of composite ozone generating units which are connected in parallel and which are supplied with the same voltage, with the second stage onward being formed by composite ozone generating units which receive different voltages, it is possible to obtain higher ozone concentration at grater generation rate than in the case where the same number of composite ozone generating units are connected in series.

What is claimed is:

1. An ozone generating apparatus comprising:
    a plurality of ozone generating units connected in series to form a plurality of stages along the flow path of a gas, each said ozone generating unit including an ozonizing chamber having a material gas inlet and a product gas outlet and ozonizer discharge electrodes disposed in said ozoning chamber; and
    an AC high-voltage power supply having a plurality of outputs with different voltage levels, wherein ozonizing discharge electrodes associated with ozone generating units of downstream stages as viewed in the direction of the flow of the gas are connected to an output of said power supply having a lower voltage level than the power supply output to which ozonizer discharge electrodes associated with ozone generation units of upstream stages are connected.

2. An ozone generating apparatus according to claim 1, wherein said power supply includes AC high-voltage power sources and said ozonizing chambers and said AC high-voltage sources have a modular construction.

3. An ozone generating apparatus according to claim 2, wherein each said ozonizer discharge electrode is of the creepage discharge type having a tabular electrode and a linear electrode which oppose each other across a dielectric member.

4. An ozone generating apparatus according to claim 2, wherein said ozonizer discharge electrode is of the spatial discharge type having a pair of electrodes opposing each other across at least one dielectric layer.

5. An ozone generating apparatus according to claim 1, wherein said ozonizing chambers of said ozone generating units have a modular construction.

6. An ozone generating apparatus according to claim 5, wherein each said ozonizer discharge electrode is of the creepage discharge type having a tabular electrode and a linear electrode which oppose each other across a dielectric member.

7. An ozone generating apparatus according to claim 5, wherein said ozonizer discharge electrode is of the spatial discharge type having a pair of electrodes opposing each other across at least one dielectric layer.

8. An ozone generating apparatus according to claim 1, wherein said power supply includes AC high-voltage power sources and said AC high-voltage sources have a modular construction.

9. An ozone generating apparatus according to claim 8, wherein each said ozonizer discharge electrode is of the creepage discharge type having a tabular electrode and a linear electrode which oppose each other across a dielectric member.

10. An ozone generating apparatus according to claim 8, wherein said ozonizer discharge electrode is of the spatial discharge type having a pair of electrodes opposing each other across at least one dielectric layer.

11. An ozone generating apparatus according to claim 1, wherein each said ozonizer discharge electrode is of the creepage discharge type having a tabular electrode and a linear electrode which oppose each other across a dielectric member.

12. An ozone generating apparatus according to claim 1, wherein said ozonizer discharge electrode is of the spatial discharge type having a pair of electrodes opposing each other across at least one dielectric layer.

13. An ozone generating apparatus comprising:
   a plurality of composite ozone generating units connected in series to form a plurality of stages along the flow path of a gas, each composite ozone generating unit including a series connection of a plurality of ozone generating units each including an ozonizing chamber having a material gas inlet and a product gas outlet and ozonizer discharge electrodes disposed in said ozonizing chamber; and
   a voltage supply having a plurality of outputs with respective, different voltage levels, wherein said ozonizer discharge electrodes are coupled to associated voltage supply outputs which supply a voltage thereto, and, wherein the voltage supply output associated with ozonizing discharge electrodes of successive downstream stages as viewed in the direction of the flow of gas have a lower voltage than the voltage supply output associated with upstream stages whereby discharge electrodes associated with downstream stages are supplied with a lower input voltage than discharge electrodes associated with upstream stages.

14. An ozone generating apparatus according to claim 13, wherein said power supply includes a voltage source having a transformer and a plurality of outputs connected to said transformer.

15. An ozone generating apparatus according to claim 14, further comprising flow distributing means connected to upstream ends of said composite ozone generating units forming said group, so as to control distribution of the material gas to said composite ozone generating units.

16. An ozone generating apparatus according to claim 14, wherein each said ozonizer discharge electrode is of the creepage discharge type having a tabular electrode and a linear electrode which oppose each other across a dielectric member.

17. An ozone generating apparatus according to claim 14, wherein said ozonizer discharge electrode is of the spatial discharge type having a pair of electrodes opposing each other across at least one dielectric layer.

18. An ozone generating apparatus according to claim 13, wherein each said ozonizer discharge electrode is of the creepage discharge type having a tabular electrode and a linear electrode which oppose each other across a dielectric member.

19. An ozone generating apparatus according to claim 13, wherein said ozonizer discharge electrode is of the spatial discharge type having a pair of electrodes opposing each other across at least one dielectric layer.

20. An ozone generating apparatus comprising:
   a group of composite ozone generating units connected in parallel with each other, each composite ozone generating unit including a series connection of a plurality of ozone generating units, and each unit including an ozonizing chamber having a material gas inlet and a product gas outlet and at least one ozonizer discharge electrode disposed in said ozonizing chamber and supplied with a voltage, said group of composite ozone generating units forming a first stage of said ozone generating chamber;
   a plurality of composite ozone generating units connected in series to the downstream end of said first stage so as to form a second downstream stage of the ozone generating apparatus as viewed in the direction of the flow of the gas, each unit of said second group including an ozonizing chamber and at least one ozonizer discharge electrode; and
   a power supply having a plurality of outputs, said plurality of outputs having different voltage levels thereon, wherein the ozonizing discharge electrodes of said units of said second stage are connected to an output of said power supply having a lower voltage level than the power supply output to which ozonizer discharge electrodes of the composite ozone generating units associated with said first stage are connected.

21. An ozone generating apparatus according to claim 20, further comprising flow distributing means connected to upstream ends of said composite ozone generating units forming said group, so as to control distribution of the material gas to said composite ozone generating units.

22. An ozone generating apparatus according to claim 21, wherein each said ozonizer discharge electrode is of the creepage discharge type having a tabular electrode and a linear electrode which oppose each other across a dielectric member.

23. An ozone generating apparatus according to claim 21, wherein said ozonizer discharge electrode is of the spatial discharge type having a pair of electrodes opposing each other across at least one dielectric layer.

24. An ozone generating apparatus according to claim 20, wherein each said ozonizer discharge electrode is of the creepage discharge type having a tabular electrode and a linear electrode which oppose each other across a dielectric member.

25. An ozone generating apparatus according to claim 20, wherein said ozonizer discharge electrode is of the spatial discharge type having a pair of electrodes opposing each other across at least one dielectric layer.

26. An ozone generating apparatus according to claim 20, wherein said power supply includes a voltage source comprising a transformer and said power supply outputs are connected to said transformer.

27. An ozone generating method comprising the steps of:
   connecting a plurality of ozone generating units in series to form successive stages, each ozone generating unit including an ozonizing chamber having a material gas inlet and a product gas outlet and at least one ozonizer discharge electrode disposed in said ozonizing chamber;
   making a material gas flow in turn from ozone generating units connected at upstream stages to ozone generating units connected at downstream stages; and
   applying a voltage to the ozoning discharge electrodes of units associated with successive stages such that the ozonizing discharge electrode in a downstream stage as viewed in the direction of the flow of the gas is supplied with a lower voltage than the voltage supplied to said ozonizer discharge electrode connected in an upstream stage.

\* \* \* \* \*